Figure 8:
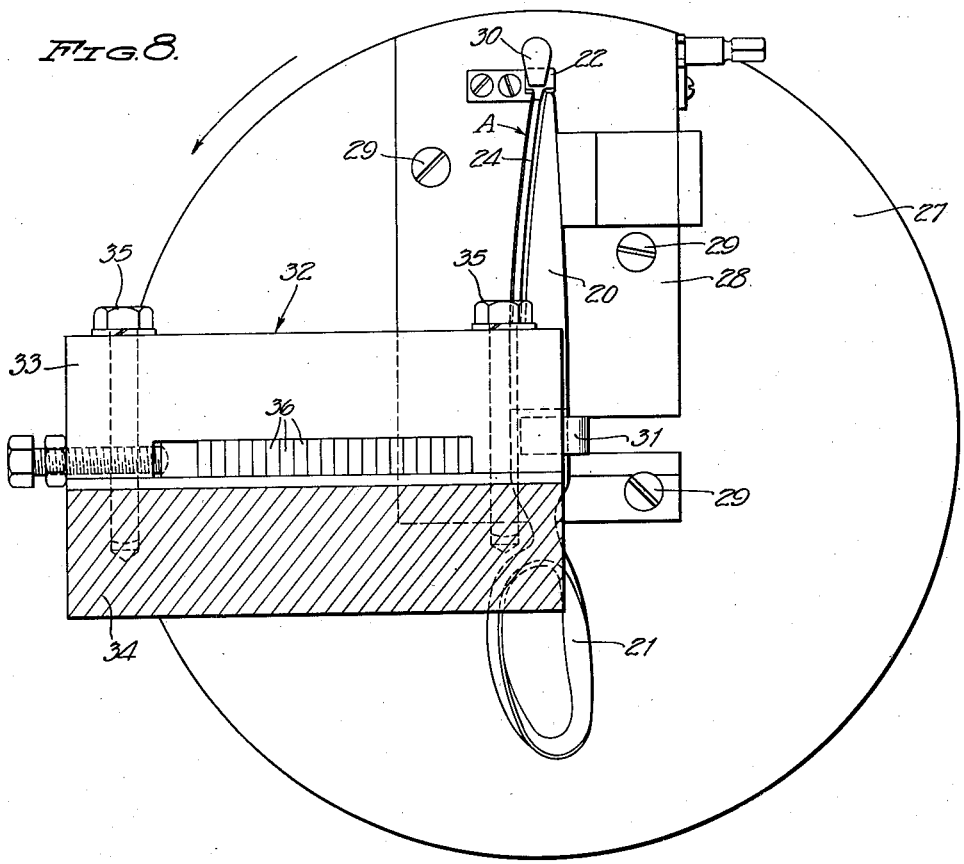

June 16, 1942.  D. L. SCHWARTZ  2,286,874
METHOD OF MAKING PINKING SHEARS
Filed July 18, 1940  4 Sheets-Sheet 1
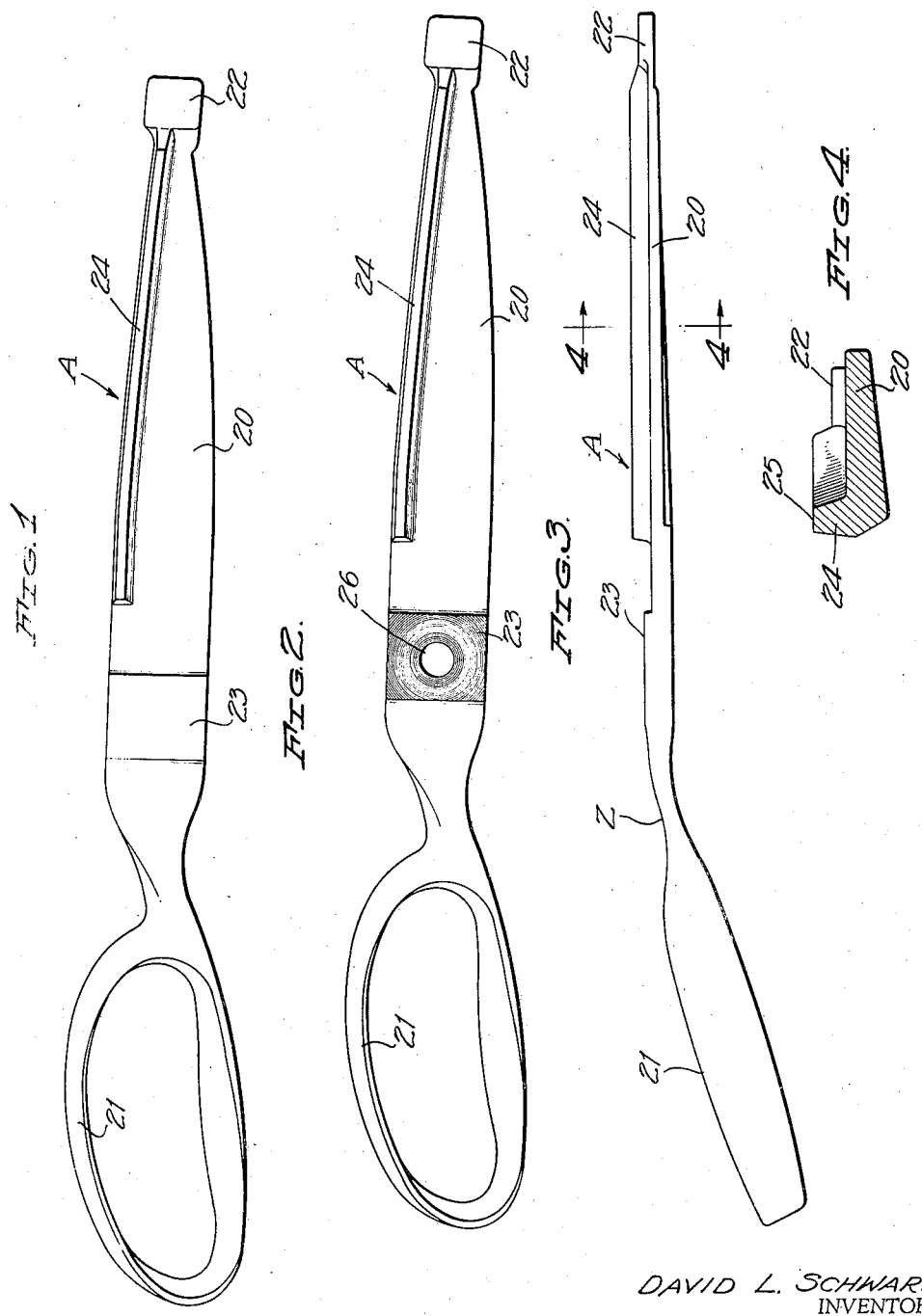
DAVID L. SCHWARTZ.
INVENTOR.
BY Ely Pattison
ATTORNEYS.

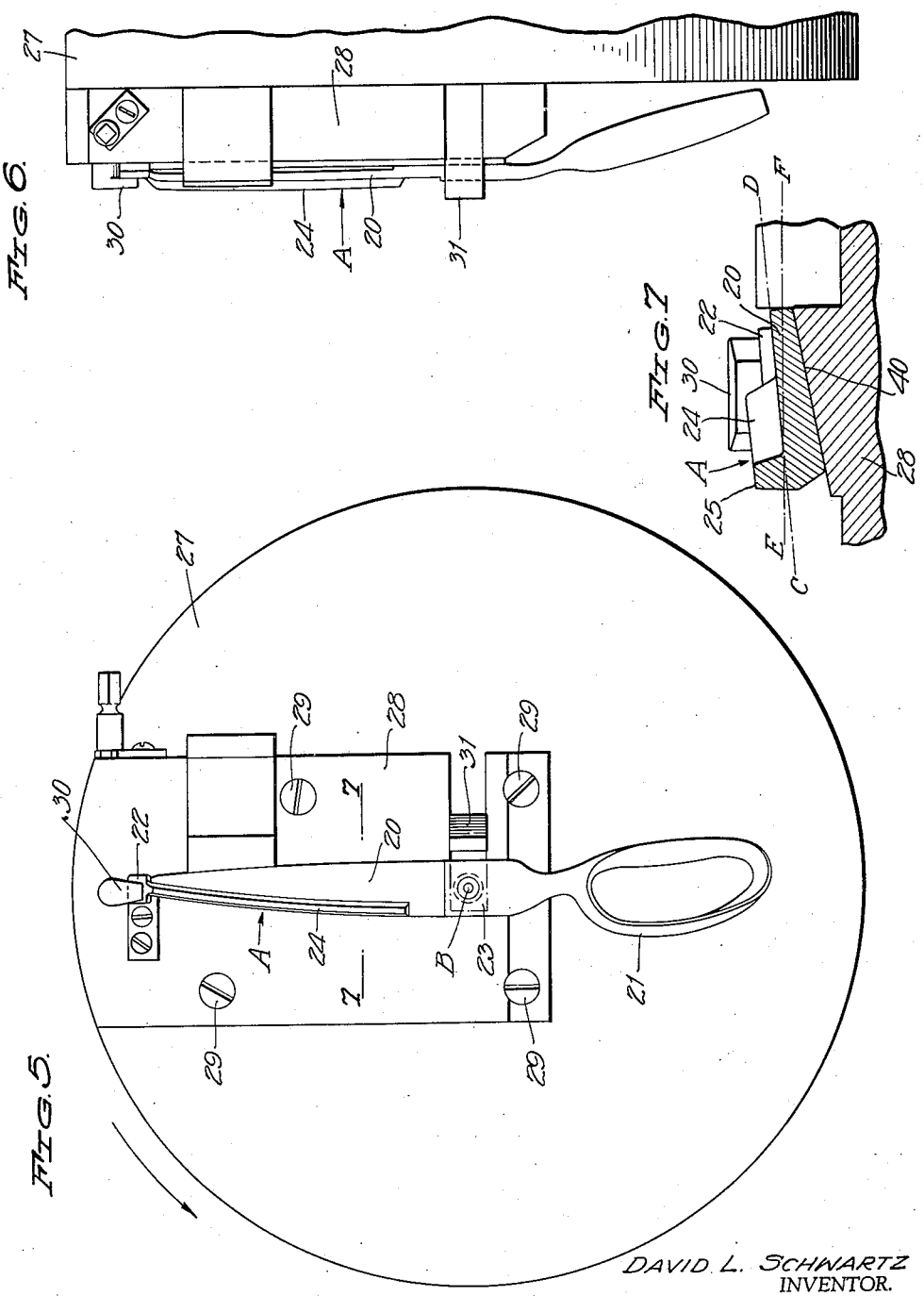

June 16, 1942.   D. L. SCHWARTZ   2,286,874
METHOD OF MAKING PINKING SHEARS
Filed July 18, 1940   4 Sheets-Sheet 3

DAVID L. SCHWARTZ.
INVENTOR.

BY Ely Pattison
ATTORNEYS.

WITNESS:

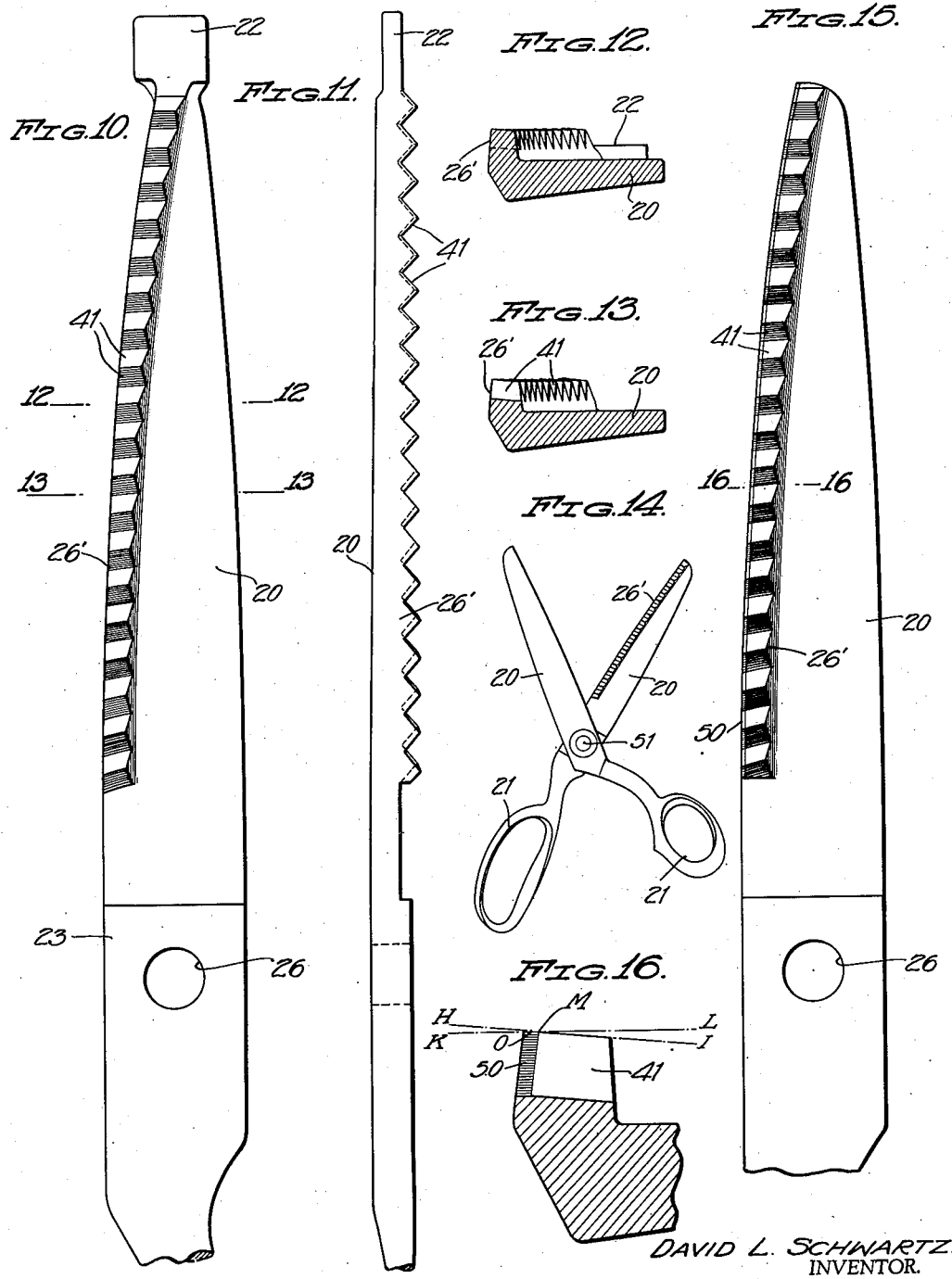

Patented June 16, 1942

2,286,874

UNITED STATES PATENT OFFICE 2,286,874

METHOD OF MAKING PINKING SHEARS

David L. Schwartz, New York, N. Y., assignor, by mesne assignments, to Samuel Briskman, New York, N. Y.

Application July 18, 1940, Serial No. 346,090

10 Claims. (Cl. 76—104)

This invention relates to new and useful improvements in pinking shears, and more particularly it pertains to a new and improved method of manufacture thereof.

In a prior patent issued May 15, 1934, to F. Wyner et al., No. 1,959,190, there is illustrated a method of manufacture of pinking shears in which the blades are undercut to form serrations, subsequently sheared to remove a portion of each tooth and thereby provide curved surfaces thereon, after which the curved surfaces are lapped to form the finished cutting edge.

While the method set forth in the aforementioned Wyner et al. patent results in an excellent shears, it is tedious to perform and this is particularly true of the lapping step or operation of the method.

One object of the present invention is to provide a novel method for the manufacture of pinking shears which materially reduces the time period over the Wyner et al. method heretofore mentioned.

It is another object of the invention to provide a novel method whereby the shearing step of the aforementioned Wyner et al. method is eliminated.

A feature of the invention resides in a novel method of preparation of the shear blades for the lapping operation, whereby the lapping period is materially reduced as compared to that of the aforementioned Wyner et al. method.

Other features of the invention will become apparent as the nature of the invention is better understood and reference will now be had to the accompanying drawings wherein is illustrated apparatus for carrying out the method, which apparatus in part, forms the subject matter of other inventions upon which I am about to file applications for Letters Patent.

Figure 9:
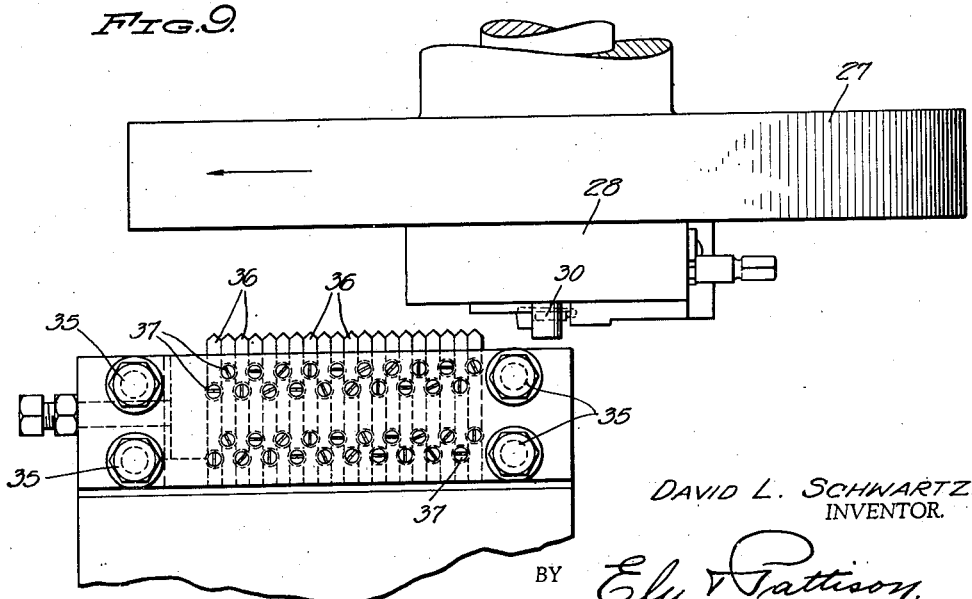

In the drawings,

Figure 1 is a view in elevation of a pinking shears blade blank employed in performing the method herein set forth, Figure 2 is a view similar to Figure 1 illustrating the blank after the first step of the method has been completed, Figure 3 is an edge view of the blade blank looking in the direction of the lower side in Figures 1 and 2, Figure 4 is a transverse sectional view on a slightly enlarged scale taken substantially on the line 4—4 of Figure 3, Figure 5 is a view in elevation illustrating the blade blank in position upon the spindle head of a milling machine to perform the operation of forming teeth upon the blade blank, Figure 6 is a fragmentary view in elevation, the view being taken at right angles to Figure 5, Figure 7 is a detail transverse sectional view on an enlarged scale, taken substantially on the line 7—7 of Figure 5, Figure 8 is a view partly in section and partly in elevation illustrating the relative position of the blade blank and the tooth forming tool of the milling machine, Figure 9 is a top plan view of the structure illustrated in Figure 8, Figure 10 is a view in elevation of a portion of the blade blank after the teeth have been formed thereon, Figure 11 is a plan view of a portion of the blade blank illustrated in Figure 10, Figure 12 is a transverse sectional view on an enlarged scale taken through one of the teeth of the blade blank substantially on the line 12—12 of Figure 10, Figure 13 is a transverse sectional view on an enlarged scale taken through the bottom of one of the spaces between two teeth substantially on the line 13—13 of Figure 10, Figure 14 illustrates two blade blanks pivotally connected together to form a pinking shears prior to the forming of the actual cutting edges of the blades, Figure 15 is a view in elevation of a portion of a completed blade, and;

Figure 16 is a transverse sectional view on an enlarged scale taken substantially on the line 16—16 of Figure 15.

Referring to Figures 1 through 4 of the drawings by reference character, the blade blank is designated A.

The blank consists of a body portion 20, having a handle 21 at one end and an ear or similar projection 22 at the other end. Adjacent the handle 21 there is a raised portion 23 which forms the working face of the blade when two blades are pivotally connected together to form a pinking shears. Extending along one edge of the blade body 20, there is a flange 24, which flange, as illustrated in Figure 4, is thicker at its base than at its outer edge 25, which latter is preferably substantially flat.

The blade blank A may be formed in any described manner and has, in actual manufacture, been successfully produced by the well known drop forging method.

In carrying out the method herein set forth, the raised portion 23 of the blade blank is finished, preferably by grinding, to provide a flat working or bearing surface for the blade when two blades are pivotally connected to form a pair of shears.

The raised portion 23 of the blade blank is also provided with a circular opening 26 to receive a bolt or pin 51, which bolt or pin provides the means for pivotally connecting the blades together to form the shears.

The opening 26 is accurately formed in the blade blank and is so located that its center forms the axis about which the blades of a finished shears pivot in operation, and this center will be herein referred to as the ultimate pivotal axis of the blades.

The blank, after the bearing surface and the opening 26 have been formed, is set up in a milling machine and a plurality of spaced teeth 26' are formed in the flange 24 of the blank. Prior to placing the blade blank in the milling machine, the handle 21 of the blank is bent out of alinement with the body portion of the blank as illustrated in Figure 3. The purpose of this is to permit the handle of the blade blank to clear the cutting tool during the formation of the teeth upon the blade blank.

In the present illustration of the invention, the teeth 26' are shown as of V-shape, but it is to be understood that the form or shape of these teeth may vary if desired, depending upon the type of cut desired in the finished shears.

During the tooth forming operation, the blank is mounted upon the spindle head 27 of a milling machine by means of a work holder 28 which is secured to the spindle head 27 by means of a plurality of screws or the like 29, see Figure 5. The blank is retained in position by means of clamping elements 30 and 31, the former of which engages the ear or projection 22 upon the end of the blank, the latter engaging the blank at a point directly over the opening 26. This clamping element 31 has been purposely eliminated in Figure 5 in order more clearly to illustrate the relation between the blade blank and the spindle head of the milling machine.

By reference to Figure 5 of the drawings, it will be noted that when the blade blank is mounted upon the spindle head of the milling machine, it is so positioned that the ultimate pivotal axis of the blade blank, i. e., the center of the opening 26, is in exact alinement with the center of the spindle head 27 which center is also the axis of rotation of the spindle of the milling machine, this point being designated B in Figure 5 of the drawings.

The reference character 32 designates the tool which performs the tooth milling operation.

This tool comprises broadly, a body portion formed of two clamping members 33 and 34 between which a series of individual cutting elements 36 are held by tightening of the bolts 35. The cutting elements 36 are individually adjustable and are retained in adjusted position by individual screws or the like 37, see Figure 9.

Referring to Figure 9 of the drawings, it will be noted that the spindle head 27 occupies a position in a plane which is at right angles to the axis of rotation thereof, while the tool 32 occupies a position in a plane which is parallel to the axis of rotation of the spindle head 27 and at right angles to the plane thereof.

It will be noted, however, by reference to Figure 7, that the blade blank A, when it is mounted in the work holder 28, rests upon a surface 40 which is angularly disposed with respect to the plane of the spindle head 27 as indicated by the line C—D in said figure, the plane of the spindle head being indicated therein by the line E—F.

The work holder 28 being carried by the spindle head 27, is, when the spindle head is rotated, carried in the presence of the tool 32 and the relative positions of the parts is such that the tool will cut through the flange 24 of the blade blank to form the teeth 26' heretofore mentioned.

The angle of the surface 40 is such that when the milling operation to form the teeth 26' is completed, the teeth will be formed within the flange 24 only, the body portion 20 of the blank not being subjected to the milling operation.

In Figures 10 through 13, of the drawings, there is illustrated a blade blank in which the teeth have been formed by the milling operation just described. By reference to said figures, it will be noted that in the milling of the flange of the blade blank to form the teeth, each tooth is formed with two curved faces 41, the arc of each of which is concentric with the axis of rotation of the spindle head and consequently the arcs of these curved faces 41 are concentric with the ultimate pivotal axis of a pair of finished blades. However, by reason of the angular position of the blade blank during the milling operation, it will be obvious that the curved faces 41 of the teeth will recede from the outer edge of the flange in which they are formed and thus provide teeth which are, in effect, undercut by reason of the receding side faces when the blade blank is returned to the plane indicated by the line E—F in Figure 7.

Each of the blades of a pair which form a shears, is produced in the manner heretofore described with the one exception that in the milling operation, the tool 32 is positioned one tooth farther removed from the axis of the spindle head in the milling of one of the blades than in the milling of the other blade, in order that the teeth in a pair of blades will be off-set to permit the teeth in each blade operating through their respective spaces between the teeth in the opposite blade in the finished shears.

In the manufacture of the blades, a given number of blades are milled with the tool 32 in one of the aforementioned positions, after which it is adjusted to the other of said positions and a similar number of blades milled, after which the blades of one lot are paired off with blades of the other lot, thus providing matched blades for each pair of shears.

After the milling operation has been completed, the ear or projection 22 is removed, the handles of the blades again bent into alinement with the body portions thereof and two blades are pivotally secured together in parallel planes by a bolt or the like 51, see Figure 14, which is passed through and suitably anchored in the openings 26 of the blades with the heretofore mentioned working faces of the blades in contacting engagement.

With the blade blanks assembled to provide a pinking shears, the shears are placed in a suitable lapping machine, not herein illustrated, and subjected to a lapping operation by rapid movement of the blade blanks relative to each other. This lapping of the blade blanks produces a second curved face upon each side of each tooth of the blades, which curved faces are designated 50 in Figures 15 and 16 of the drawings, thus completing the blade forming operations.

By reason of the fact that the blades were milled in an angular position in a plane which was angularly disposed with relation to the plane of the spindle head, and are positioned in parallel planes during the lapping operation, the curved face 41 and its respective curved face 50, on each side of each tooth will be in different planes which are angularly related to each other as indicated by the lines H—I and K—L in Figure 16 which planes intersect each other at the point M as illustrated in Figure 16 of the drawings although, both of these curved faces will have arcs concentric with the ultimate pivotal axis of their respective blade.

After the lapping operation has been completed the point designated O in Figure 16 constitutes the cutting zone of the blade since it is that point at which the arcs of the curved faces 50 of the two blades intersect when the blades are moved towards each other to perform the cutting operation.

By examination of Figure 16, it will be obvious that the angular relation of each curved face 50 relatively to its respective curved face 41, provides immediate clearance of the edges O of the blades as they pass each other in a cutting operation, thus insuring a clean and positive shearing of all types of fabrics and similar materials.

While the invention has been herein illustrated in its preferred form, it is to be understood that it is not to be limited specifically to the details herein set forth and that it may be practiced in any manner which rightfully falls within the scope of the appended claims.

Having thus described the invention what is claimed as new is:

1. The method of making serrated cutting edges upon the blades of pinking shears, which method consists in forming in a blade blank the ultimate pivotal axis of the blade, milling teeth in the blade blank, lapping cutting edges on each of said teeth, said milling and lapping operations being separately performed in angularly disposed planes, each of which is concentric with the ultimate pivotal axis of the blade and with the longitudinal axis of the blade blank disposed in right angular relation to the ultimate pivotal axis of the blade in each of said planes.

2. The method of making serrated cutting edges upon blades for pinking shears, which method consists in forming the ultimate pivotal axis of a pair of cooperating blades in a blade blank, forming serrations in the blade blank to provide spaced teeth each having arcuate surfaces concentric with the ultimate pivotal axis of the blade, and subsequently removing a portion of each of the arcuate surfaces of each of said teeth to form arcuate surfaces on each of said teeth concentric with the ultimate pivotal axis of the blade and angularly disposed with respect to their respective first mentioned curved surfaces.

3. The method of making serrated cutting edges upon blades for pinking shears, which method consists in forming the ultimate pivotal axis of a pair of cooperating blades in a blade blank, forming serrations in the blade blank to provide spaced teeth each having arcuate surfaces concentric with the ultimate pivotal axis of the blade, and subsequently removing a portion of each of the arcuate surfaces of each of said teeth to form arcuate surfaces on each of said teeth concentric with the ultimate pivotal axis of the blade, the arc of each of the second mentioned curved surfaces intersecting the arc of its respective first mentioned curved surface.

4. The method of making serrated cutting edges upon blades for pinking shears, which method consists in forming the ultimate pivotal axis of a pair of cooperating blades in a blade blank, forming serrations in the blade blank to provide spaced teeth each of which has a plurality of arcuate surfaces concentric with the ultimate pivotal axis of the blade, and subsequently removing a portion of each of the arcuate surfaces of each of said teeth to form a second arcuate surface concentric with the ultimate pivotal axis of the blade, said second arcuate surfaces on each tooth merging with their respective first mentioned arcuate surfaces on their respective teeth.

5. The method of making serrated cutting edges upon blades for pinking shears, which method consists in forming the ultimate pivotal axis of a pair of cooperating blades in a blade blank, forming serrations in the blade blank to provide spaced teeth, and subsequently forming merging curved surfaces on each tooth, which curved surfaces are concentric with the ultimate pivotal axis of the blade but in different angular planes with respect thereto.

6. The method of making serrated cutting edges upon blades for pinking shears, which method consists in forming a flange upon one edge of a blade blank, forming the ultimate pivotal axis of a pair of cooperating blades in the blade blank, subjecting the flange of the blade blank to a milling operation in a plane other than right angles with respect to the ultimate pivotal axis of the blade to form teeth in said flange having curved side surfaces concentric with the ultimate pivotal axis of the blade, and subsequently removing a portion of each of the curved surfaces of each tooth with the blade blank retained in a plane substantialy at right angles to the ultimate pivotal axis of the blade, thereby to form additional curved surfaces upon the sides of each tooth angularly disposed with respect to their respective first mentioned curved surfaces, the second mentioned curved surfaces being concentric with the ultimate pivotal axis of the blade.

7. The method of making serrated cutting edges upon blades for pinking shears, which method consists in forming a flange upon one edge of a blade blank, forming the ultimate pivotal axis of a pair of cooperating blades in the blade blank, subjecting the flange of the blade blank to a milling operation in a plane other than right angles with respect to the ultimate pivotal axis of the blade to form teeth in said flange having curved side surfaces concentric with the ultimate pivotal axis of the blade, and subsequently removing a portion of each of the curved surfaces of each tooth with the blade blank retained in a plane substantially at right angles to the ultimate pivotal axis of the blade, thereby to form additional curved surfaces upon the sides of each tooth each of which second mentioned curved surfaces merges with its respective first mentioned curved surface on each tooth in angular relation therewith.

8. The method of making serrated cutting edges upon blades for pinking shears, which method consists in forming a flange upon one edge of a blade blank, forming the ultimate pivotal axis of a pair of cooperating blades in the blade blank, mounting said blade in a plane concentric with the ultimate pivotal axis of the blade and angularly disposed with respect to a plane in right angular relation to the ultimate pivotal axis of the blade, removing portions of the flange of the blade blank to form spaced teeth thereon having curved side faces concentric with the ultimate pivotal axis of the blade, subsequently mounting the blade blank in a plane concentric with and at substantially right angles to the ultimate pivotal axis of the blade, and finally removing portions of the curved side surfaces of each of the teeth to form on each side of each tooth a second curved surface merging with its respective first mentioned curved surface in angular relation thereto.

9. The method of making pinking shears which method consists in forming in each of a pair of blade blanks, the ultimate pivotal axis of the blades, milling teeth in each of the blade blanks, securing the blade blanks together for pivotal movement about their ultimate pivotal axis and finally lapping cutting edges on each tooth of each blade, the milling and lapping operations being separately performed in angularly related planes, each of which is concentric with the ultimate pivotal axis of the blades and with the longitudinal axis of the blade blank disposed in right angular relation to the ultimate pivotal axis of the blade in each of said planes.

10. The method of making pinking shears which method consists in forming the ultimate pivotal axis in each of a pair of blade blanks, milling teeth in each of said blade blanks concentric with the ultimate pivotal axis of the pair of blades and in a plane at an angle other than right angles to the ultimate pivotal axis of a pair of blades, pivotally connecting together a pair of said blades in parallel planes, each of which planes is substantially at right angles to the ultimate pivotal axis of a pair of blades, and lapping the blades to provide cutting edges in arcs different from the arcs milled upon each of the aforementioned teeth.

DAVID L. SCHWARTZ.